United States Patent
Kwon et al.

(10) Patent No.: US 6,963,380 B1
(45) Date of Patent: Nov. 8, 2005

(54) METHOD OF FABRICATING HOLOGRAM DIFFUSER FOR LIQUID CRYSTAL DISPLAY AND LIQUID CRYSTAL DISPLAY DEVICE USING THE SAME

(75) Inventors: Young Wan Kwon, Seoul (KR); Jong Weon Moon, Seoul (KR); Chul Park, Youngin-shi (KR); Sung Woo Noh, Sungnam-shi (KR); Seon Gyoung Kim, Sungnam-shi (KR)

(73) Assignees: LG. Philips LCD, Co., Ltd., Seoul (KR); LG Electronics Inc., Seoul (KR)

( * ) Notice: Subject to any disclaimer, the term of this patent is extended or adjusted under 35 U.S.C. 154(b) by 226 days.

(21) Appl. No.: 09/667,006

(22) Filed: Sep. 21, 2000

(30) Foreign Application Priority Data

Sep. 21, 1999 (KR) .............................. P1999-40812

(51) Int. Cl.[7] ........................................... G02F 1/1335
(52) U.S. Cl. ..................................................... 349/112
(58) Field of Search ...................... 349/112, 201, 122, 349/106, 118, 93; 359/15, 3, 7

(56) References Cited

U.S. PATENT DOCUMENTS

| | | | | |
|---|---|---|---|---|
| 5,471,327 A | * | 11/1995 | Tedesco et al. | 359/15 |
| 5,629,784 A | * | 5/1997 | Abileah et al. | 349/112 |
| 6,075,581 A | * | 6/2000 | Shirochi | 349/112 |
| 6,141,123 A | * | 10/2000 | Nakashima et al. | 359/3 |
| 6,432,498 B1 | * | 8/2002 | Ohtaki et al. | 428/40.1 |

* cited by examiner

Primary Examiner—Dung T. Nguyen
Assistant Examiner—Thoi V. Duong
(74) Attorney, Agent, or Firm—Birch Stewart Kolasch & Birch LLP

(57) ABSTRACT

A hologram diffuser for a liquid crystal display wherein a resin layer with a desired thickness is formed on an upper substrate. A hologram pattern is formed in the resin layer using a hologram plate. A smoothing layer with a desired thickness is formed on the hologram layer provided with the hologram pattern. Accordingly, it is possible to assure a wide visual angle and realize a high picture quality.

8 Claims, 2 Drawing Sheets

METHOD OF FABRICATING HOLOGRAM DIFFUSER FOR LIQUID CRYSTAL DISPLAY AND LIQUID CRYSTAL DISPLAY DEVICE USING THE SAME

BACKGROUND OF THE INVENTION

1. Field of the Invention

This invention relates to a liquid crystal display and to a method of fabricating a hologram diffuser for a liquid crystal display that is adapted to widen a visual angle of the liquid crystal display.

2. Description of the Related Art

Liquid crystal displays (LCDS) are gaining wider application due to their characteristics of light weight, thin thickness, and low power consumption. Accordingly, the LCDs have been used in office automation equipment, in audio/video equipment, etc. An LCD controls a transmitted amount of a light beam in accordance with image signals applied to a number of control switches arranged in a matrix to display a desired picture on a screen. However, this type of LCD has a drawback arising from the narrow visual angle of the liquid crystal. The display quality considerably deteriorates when being viewed beyond the visual angle range. The visual angle of the LCD is described with reference to FIG. 1 below.

Referring to FIG. 1, a conventional LCD includes a back light unit 10 for generating and uniformly supplying a light beam. A lower polarizer 12 arranged above the back light unit 10 changes a polarization characteristic of the light beam. A lower substrate 14 is arranged above the lower polarizer 12 and provided with switching devices (not shown) in a matrix for controlling the transmitted amount of the light beam. A liquid crystal layer 16 is formed on the lower substrate 14, and a color filter layer 18 formed on the liquid crystal layer 16. An upper substrate 20 is arranged on the color filter layer 18, and an upper polarizer 22, arranged above the upper substrate 20, converts a polarization characteristic of the light beam.

In FIG. 1, the back light unit 10 has a light source for generating a light beam, a light-guide plate for uniformly guiding the light beam generated from the light source into a liquid crystal panel, and a reflective plate positioned under the light-guide plate to reflect a light beam going to the lower surface or the side surface of the light-guide plate toward the liquid crystal panel. This configuration allows the uniform progression of the light beam from the back light unit 10 into the liquid crystal panel. The light beam is polarized by means of the lower polarizer 12. The polarized light beam passes through a liquid crystal layer 16 controlled by means of the switching devices (not shown), where its polarization direction rotates.

In FIG. 1, the light beam having its polarization direction rotated by the liquid crystal layer 16 passes through the color filter layer 18 to yield a color wavelength corresponding to each color filter. The light beam realized into the desired color by the color filter layer 18 progresses, via the upper substrate 20, into the upper polarizer 22. The upper polarizer 22 and the lower polarizer 12 are crossed to be perpendicular to each other. Thus, the upper polarizer 22 transmits only light having its polarization direction rotated by means of the liquid crystal.

As described above, a basic principle of the TN-mode (twisted nematic mode) LCD is to utilize a polarized light beam (polarized by means of the polarizers) which passes through the liquid crystal so that its polarization direction rotates. Thus, the distance the light beam progresses through the liquid crystal layer 16 becomes very significant. Generally, in the case of a liquid crystal provided between polarizers crossed perpendicular to each other, the thickness of the liquid crystal used to change the polarization direction of a light beam is given by the following equation:

$$(\Delta n)Z = \lambda/2 \tag{1}$$

wherein $\Delta n$ represents the refractive index difference between the perpendicular direction and the parallel direction of the incident light (which appears as a complex refraction characteristic of the liquid crystal); $Z$ represents the thickness of the liquid crystal; and $\lambda$ is the wavelength of light. In this case, an effect identical to equation (1) is obtained when the direction of the light is perpendicular to the liquid crystal panel, and the result is a reliable light shut-off. However, an accurate light shut-off cannot be obtained by the upper perpendicular polarizer because the light path increases when the light runs with an inclination, thereby generating a change in the polarization direction of the light. In order to overcome this problem, the linearity of a light beam must be increased.

If the linearity of a light beam is increased, then the visual angle of the LCD becomes limited. Widening the visual angle requires a diffusion layer capable of again scattering the light beam passing through the liquid crystal layer 16. In the conventional method, the diffusion layer is arranged between the upper substrate and the upper polarizer. For example, if the diffusion layer is used as a lens array, a lenticular lens sheet and a cholesteric liquid crystal (CLC) can be used.

When a diffusion layer is employed to widen the above described visual angle of the LCD, the color purity and picture quality of the LCD deteriorates due to the blending of the light beams emitting from each of the R (red), G (green) and B (blue) pixels. As a result, it becomes necessary to provide a novel scheme for solving the above problems.

It is to be understood that both the foregoiong general description and the following detailed description are exemplary and explanatory and are intended to provide further explanation of the invention as claimed.

SUMMARY OF THE INVENTION

The present invention provides, in part, a method of fabricating a hologram diffuser for a liquid crystal display that is adapted to widen the visual angle of the liquid crystal display, and a liquid crystal display device employing the same.

The present invention provides, in part, a liquid crystal display having a hologram diffuser that is adapted to widen the visual angle of the liquid crystal display.

In order to achieve these and other objects of the invention, a method of fabricating a hologram diffuser for a liquid crystal display according to one embodiment of the invention includes the steps of forming a resin layer with a desired thickness on an upper substrate, forming a hologram pattern at the resin layer, and forming a smoothing layer with a desired thickness on the hologram (resin) layer provided with the hologram pattern.

A liquid crystal display employing a hologram diffuser according to an embodiment of the invention includes a hologram layer arranged between an upper substrate and a color filter layer, where the hologram layer is provided with a hologram pattern to diffuse a light beam. A smoothing layer provided at the upper portion of the hologram layer activates the diffusion of the light beam at the hologram layer.

BRIEF DESCRIPTION OF THE DRAWINGS

The accompanying drawings are included to provide a further understanding of the invention. The drawings illustrate embodiments of the invention and together with the description serve to explain the principles of the embodiments of the invention.

DETAILED DESCRIPTION OF THE PREFERRED EMBODIMENTS

Advantages of the present invention will become more apparent from the detailed description given herein after. However, it should be understood that the detailed description and specific examples, while indicating preferred embodiments of the invention, are given by way of illustration only, since various changes and modification within the spirit and scope of the invention will become apparent to those skilled in the art form this detailed description.

Figure 2:
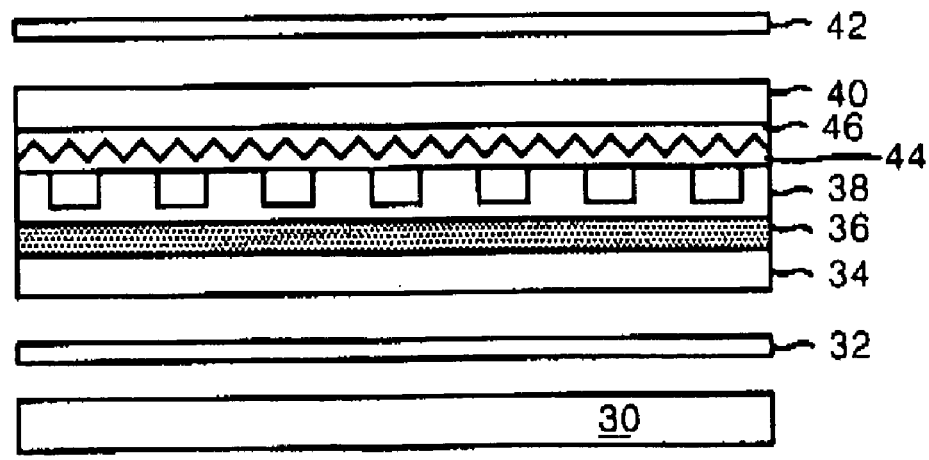
FIG. 2 is a sectional view showing the structure of a liquid crystal display employing a hologram diffuser according to an embodiment of the present invention.

FIG. 2, shows a liquid crystal display using a hologram diffuser according to an embodiment of the present invention. The liquid crystal display includes a back light unit 30 for generating and supplying a uniform light beam. A lower polarizer 32 arranged above the back light unit 30 converts the polarization characteristic of the light beam. A lower substrate 34 arranged above the lower polarizer 32 is provided with switching devices (not shown) in a matrix for controlling the amount of the light beam which is transmitted. A liquid crystal layer 36 is formed on the lower substrate 34, and a color filter layer 38 is formed on the liquid crystal layer 36. A smoothing layer 44 is formed on the color filter layer 38, and a hologram layer 46 is formed on the smoothing layer 44. An upper substrate 40 is arranged on the hologram layer 46, and an upper polarizer 42 is arranged above the upper substrate 40 to convert a polarization characteristic of the light beam.

Figure 1:
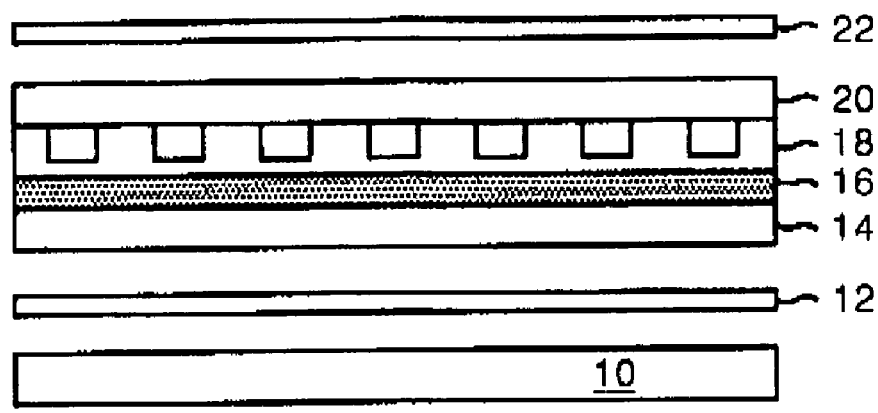
FIG. 1 is a sectional view showing the structure of a conventional liquid crystal display.

The function and operation of the back light unit 3.0, the upper and lower polarizers 42 and 32, the upper and lower substrates 40 and 34, the liquid crystal layer 36 and the color filter layer 38 are similar to those set forth in FIG. 1. Therefore a detailed explanation of these layers will be omitted.

The color filter layer 38 may be formed on the lower substrate 34, and switching devices (not shown) may be formed on the upper substrate 40. The hologram layer 46 diffuses the polarized light beam. Since the light beam is distributed with uniform diffusion in all orientations by the hologram layer 46, it is possible to attain a wide visual angle.

The visual angle is controlled by manipulating the hologram pattern formed at the hologram layer 46. The smoothing layer 44 smoothes the surface of the hologram layer 46 and activates the light beam diffusion at the hologram layer 46. To achieve this end, the smoothing layer 44 has a refractive index different from the hologram layer 46, where the smoothing layer is formed at the opposite portion of the hologram layer 46. The preferable difference between the refractive index n1 of the hologram layer 46 and the refractive index n2 of the smoothing layer 44 is greater than 0.1. This relationship can also be expressed in the following equation (2):

$$|n2-n1|>0.1 \qquad (2)$$

The hologram layer 46 is arranged between the upper substrate 40 and the color filter layer 38 to accurately diffuse the light beam and to prevent dimming of the image. As a result, it becomes possible to realize high resolution.

As described above, a liquid crystal display employing a hologram diffuser according to the present invention forms the hologram layer 46 and the smoothing layer 44 at the upper substrate 40, thereby assuring a wide visual angle and realizing high resolution.

Figure 3A:
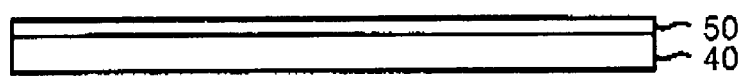
FIG. 3A to FIG. 3F are sectional views for explaining a method of fabricating the hologram diffuser shown in FIG. 2.

FIGS. 3A to 3F show a method of fabricating a hologram diffuser for an LCD according to an embodiment of the present invention. The first step of the method is forming a resin layer 50 with a desired thickness on the substrate 40, as shown in FIG. 3A. The resin layer 50 is formed by coating a 0.5 to 10 $\mu$m layer of resin on the substrate 40. Preferably, spin coating is employed to apply the resin layer 50. The spin coating method is used for accurate thickness control, but a knife coating method or an extrusion coating method may also be used. A thermal hardening resin or an ultraviolet hardening resin may be used for the material of the resin layer.

Figure 3B:
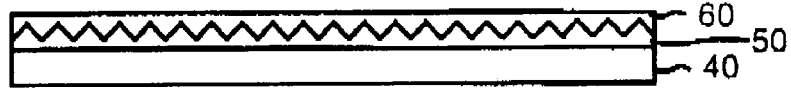

The second step is the formation of a hologram pattern on the resin layer 50. The hologram pattern is formed on the resin layer 50 by positioning an original hologram plate 60 at the upper portion of the resin layer 50 as shown in FIG. 3B. Pressure is then applied. A roll pressing method or a plate pressing method is used for the pressing.

Figure 3C:
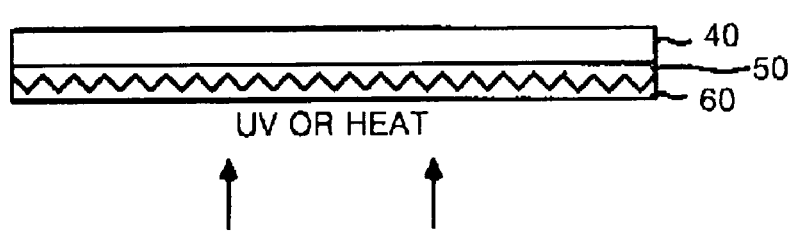

Subsequently, as shown in FIG. 3C, heat or ultraviolet (UV) radiation is irradiated onto the resin layer 50 to cure the resin layer 50 in which the hologram pattern, formed by the original hologram plate 60, is transcribed. When the material of the resin layer 50 is a thermal hardening resin, heat is applied for hardening. When the material of the resin layer 50 is an ultraviolet hardening resin, ultraviolet light is applied for hardening.

Figure 3D:
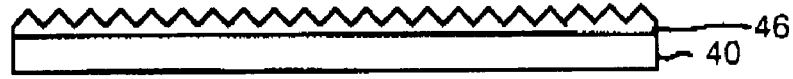

Alternatively, the transcribed resin layer 50 can be hardened by using heat or ultraviolet light after pressing, and then removing the original hologram plate. Next, the hologram layer 46 provided with the hologram pattern is formed by removing the original hologram plate 60 as shown in FIG. 3D.

Figure 3E:
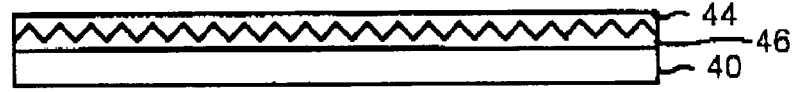

The third step entails forming a smoothing layer 44 with a desired thickness on the hologram layer 46 provided with the hologram pattern. As shown in FIG. 3E, the smoothing layer 44 is formed to have a thickness of 0.1 to 5 $\mu$m at the upper portion of the hologram layer 46 using the spin coating method. In this case, the smoothing layer 44 is made from a material having a refractive index difference of more than 0.1 from the hologram layer 46.

Figure 3F:
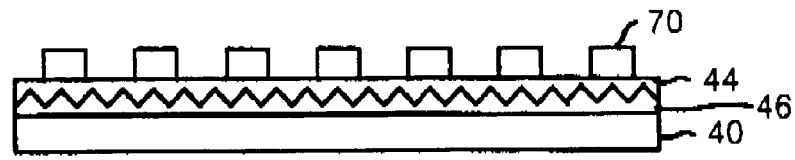

The fourth step is the formation of color filter layers 70 or thin film transistors (TFTs) on the smoothing layer 44. As shown in FIG. 3F, the color filter layers 70 may be formed at the upper portion of the smoothing layer 44. Alternatively, TFTs (not shown) may be formed. In this case, known fabrication methods can be used to form the color filters or the TFTs.

The present invention, as described above, assures a wide visual angle accompanied by high picture quality.

Although the present invention has been explained by the embodiments shown in the drawings and described above, it should be understood that a person having ordinary skill in the art would not be limited to the described embodiments, but rather that various changes or modifications thereof are possible without departing from the spirit of the invention. Accordingly, the scope of the invention shall be determined only by the appended claims and their equivalents.

What is claimed is:

1. A method for fabricating a hologram diffuser which comprises:

providing a substrate;

forming a resin layer on the substrate;

forming a hologram pattern in the resin layer to uniformly diffuse light in all orientations by pressing an original hologram pattern into the resin layer;

forming a smoothing film on the patterned resin layer, wherein the smoothing layer smoothes a surface of the hologram pattern and activates light beam diffusion at the hologram pattern; and forming color filters or thin film transistors at an upper portion of the smoothing layer.

2. The method of claim 1, wherein forming the hologram pattern includes:

locating an original hologram plate at an upper portion of the resin layer;

hardening the resin; and removing the original hologram plate.

3. The method of claim 2, wherein the resin layer is made from a thermal hardening resin, and further including the step of curing the resin layer by applying heat.

4. The method according to claim 2, wherein the resin layer is made from an ultraviolet hardening resin, and further including the step of curing the resin layer by applying ultraviolet light.

5. The method of claim 1, wherein the resin layer has a thickness of 0.5 to 10 $\mu$m.

6. The method of claim 1, wherein the resin layer is formed using spin coating, knife coating or extrusion coating.

7. The method of claim 1, wherein the smoothing layer has a thickness of 0.1 to 5 $\mu$m.

8. The method of claim 1, wherein the smoothing layer has a refractive index difference of greater than 0.1 compared to the refractive index of the resin layer.

* * * * *